United States Patent [19]
Mathieu et al.

[11] Patent Number: 5,121,935
[45] Date of Patent: Jun. 16, 1992

[54] READILY REMOVABLE AND COLLAPSIBLE BICYCLE FENDER

[76] Inventors: Francis X. Mathieu, 21 Coolidge Rd., Worcester, Mass. 01602; Francis X. Boyce, 9 Oak Hill Ave., Clinton, Mass. 01510

[21] Appl. No.: 643,537

[22] Filed: Jan. 18, 1991

[51] Int. Cl.⁵ .......................................... B62D 25/16
[52] U.S. Cl. ................... 280/152.3; 280/852
[58] Field of Search .............. 280/152.1, 152.2, 152.3, 280/158.1, 160.1, 847, 851, 852, 856; 63/3, 11; 267/154

[56] References Cited

U.S. PATENT DOCUMENTS

| | | | |
|---|---|---|---|
| 544,935 | 8/1895 | Shone | 280/152.3 |
| 545,212 | 8/1895 | Snow | 280/854 X |
| 590,980 | 10/1897 | Hall | 280/152.3 |
| 606,359 | 6/1898 | Reid | 280/152.3 |
| 635,614 | 10/1899 | Thym | 280/152.3 |
| 741,997 | 10/1903 | Beckwith | 280/152.3 |
| 868,461 | 10/1907 | Lockwood | 280/152.3 |
| 2,956,795 | 10/1960 | Foster | 267/156 |
| 3,410,023 | 11/1968 | Anello | 63/11 X |
| 4,094,309 | 6/1978 | Grzenia | 267/156 X |
| 4,319,763 | 3/1982 | White | 280/152.3 |
| 4,724,548 | 2/1988 | London | 63/11 X |

FOREIGN PATENT DOCUMENTS

| | | | |
|---|---|---|---|
| 802363 | 2/1951 | Fed. Rep. of Germany | 267/156 |
| 6990 | of 1896 | United Kingdom | 280/152.3 |
| 16472 | of 1896 | United Kingdom | 280/152.3 |
| 14261 | of 1897 | United Kingdom | 280/152.3 |

*Primary Examiner*—Andres Kashnikow
*Assistant Examiner*—Brian L. Johnson
*Attorney, Agent, or Firm*—Jerry Cohen; Edwin H. Paul

[57] ABSTRACT

A retractable fender for a bicycle which includes a strip of flexible resilient material such as spring steel which is fixed at one end to a connector which is, in turn, mounted to a fixed structure of a bicycle such as the seat adjusting bolt or the bolt for one of the wheel brake calipers has two normal states. In a first state, the strip is self-biased into a helical coil configuration and the strip is straight between the side edges of the strip. In a second state, the strip is longitudinally straight and rigid and self-biased into a bowed configuration between the side edges of the strip. The fender is rendered to its second state by uncoiling the strip so that it is fully extended and allowing the strip to assume its natural bowed configuration so that the strip is effectively locked into a straight rigid configuration. The strip is again retracted by making the free end of the strip flat so that the strip returns to its normal helical coil configuration.

8 Claims, 2 Drawing Sheets

READILY REMOVABLE AND COLLAPSIBLE BICYCLE FENDER

BACKGROUND OF THE INVENTION

The majority of modern bicycles are not equipped with fenders, primarily because the fenders add unnecessary weight to the bicycle, increase the cost, and detract from the design and appearance of the bicycle. The lack of fenders on a bicycle poses no particular problem under conditions of normal use. However, when riding a bicycle in the rain or over a wet surface, the tires pick up water, mud, sand or other material and throw the material onto the back and the front of the rider. Under these adverse conditions, it is desirable to have fenders on the bicycle to protect the rider as much as possible from the material which is picked up from the riding surface. In addition, the frames of most lightweight modern bicycles have no provision for the attachment of fenders.

In the past there have been some attempts to mount retractable fenders on bicycles. Such retractable fenders usually consist of a strip of flexible material which is supported within a collapsible or foldable framework. The framework consists of one or more fork-like levers which are pivotedly attached to a fixed portion of the bicycle frame. When a fender is needed, the lever is moved to its outer position which extends the strip to its fender-like orientation. When a fender is no longer needed, the supporting lever or levers is loosened and moved to its inner or retracted position which enables the strip of flexible material to be wound into a coil or folded. The mechanisms for supporting the collapsible fenders of the prior art are just as heavy if not heavier than traditional fenders due to the framework which forms part of the fender. In addition, the retractable fenders require tools for loosening and tightening bolts or fastening elements each time that the fender is moved from its fully extended position to its collapsed position. In addition, the prior art retractable fenders do not improve the aesthetic considerations of modern bicycles and are generally less attractive than traditional fenders. These and other difficulties experienced with the prior art bicycle fenders have been obviated in a novel manner by the present invention.

SUMMARY OF THE INVENTION

It is, therefore, a principal object of the present invention to provide a retractable fender strip for a bicycle which is mounted on a fixed structure of the bicycle and is self-supporting when extended.

Another object of the present invention is the provision of a retractable self-supporting fender strip for the rear wheel of the bicycle which can be mounted on the horizontally extending seat-adjusting bolt of a bicycle which is equipped with such a bolt or other appropriate existing bolts.

A further object of the present invention is the provision of a retractable self-supporting fender strip which can be mounted on the horizontal bolt of a caliper-type wheel brake of a bicycle which is equipped with such a brake.

Still another object of the invention is the provision of a retractable fender strip which is self-supporting when extended and which is provided with means for adjusting the stiffness of the strip in the extended state.

With these and other objects in view, as will be apparent to those skilled in the art, the invention resides in the combination of parts set forth in the specification and covered by the claims appended hereto.

In general, the invention consists of a retractable fender for a bicycle which includes a strip of flexible resilient material that has two normal states. In its first state, the strip is in a self-biased helical coil in which the strip is straight between side edges of the strip. In its second state, the strip is longitudinally straight and rigid and has a bowed shape between the longitudinal side edges of the strip. This strip is fixed to a connector which is, in turn, mounted to a fixed structure of the bicycle. More specifically, the connector is a bracket which is mounted on any convenient structure of the bicycle such as the seat-adjusting bolt of the bicycle so that it extends above the rear wheel of the bicycle or on the horizontal bolt which forms part of a caliper-type wheel brake. When the retractable fender of present invention is applied to the front of the bicycle, the strip, when extended, extends rearwardly and downwardly behind the front wheel. When the retractable fender is mounted to the rear brake caliper, the strip, when extended, extends rearwardly and upwardly above the rear wheel.

BRIEF DESCRIPTION OF THE DRAWINGS

The character of the invention, however, may be best understood by reference to one of its structural forms, as illustrated by the accompanying drawings, in which.

DETAILED DESCRIPTION OF THE INVENTION

Figure 1:
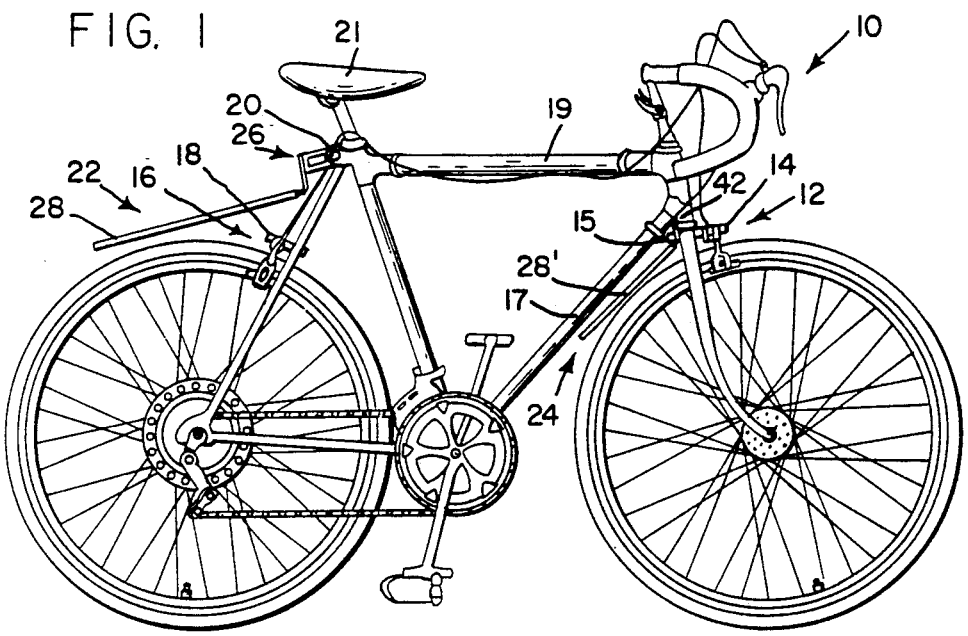
FIG. 1 is a side elevational view of a multiple speed bicycle having caliper-type wheel brakes and an adjustable seat to which the fenders of the present invention have been attached in connection with the front and rear wheels of the bicycle.

Referring first to FIG. 1, two embodiments of the present invention are shown applied to a modern multi-speed bicycle which is generally indicated by the reference numeral 10 and which includes a front caliper brake which is generally indicated by the reference numeral 12 and a rear caliper brake which is generally indicated by the reference numeral 16. The front caliper brake 12 includes a generally horizontal bolt 14 and a nut 15 which fastens to the end of the bolt 14 and mounts the front caliper brake 12 to the front fork of the bicycle. The rear caliper brake includes a bolt 18 which fastens the rear caliper brake to the rear fork of the bicycle. The bicycle 10 also includes a seat-adjusting bolt 20 at the end of the top horizontal bar 19 of the bicycle and just below the seat 21.

Referring also to FIGS. 2-6, a first embodiment of the present invention is generally indicated by the reference numeral 22 and is shown in FIG. 1 attached to the seat-adjusting bolt 20. The retractable fender 22 of the present invention comprises a mounting bracket which is generally indicated by the reference numeral 26 and a strip of flexible resilient material 28 which is fixed to a first horizontal end 30 of the bracket 26 by fasteners 32. The strip 28 which is used as the fender of the present invention is a well known material. The strip is made from a straight flat strip of high carbon or stainless steel which is deformed to form a cross curve and "backwound" into a coil. When the strip is "backwound", it is coiled toward the convex side of the strip. The strip is converted from the extended state by forcing the ends of the strip from a bowed configuration to a straight configuration which enables the strip to assume a coiled configuration and is self-biased into this configuration. The strip is converted to the extended configuration by uncoiling the strip until it is straight and forcing the ends of the strip into its normal bowed configuration. One known use for strips having the characteristics described above is for novelty expandable bracelets. Although high carbon or stainless steel are the preferred materials for the strip, any spring-like material which can be formed to assume the two normal states described above could be acceptable.

Figure 2:
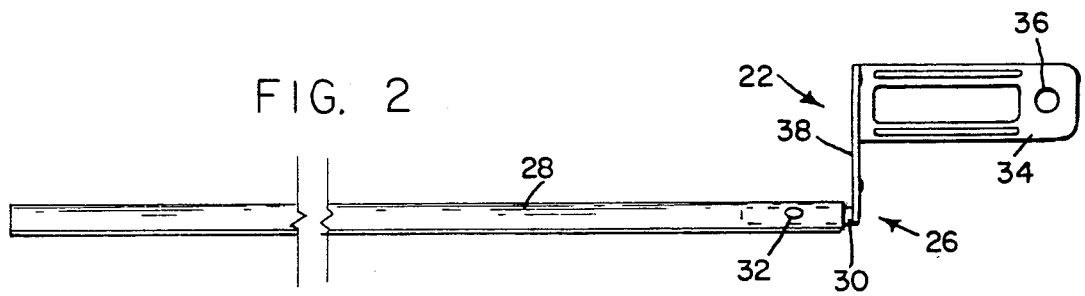
FIG. 2 is a side elevational view of a first embodiment of the invention which is utilized with the seat-adjusting bolt of the bicycle for extension over the rear wheel of the bicycle and showing the fender in its extended orientation.
Figure 4:
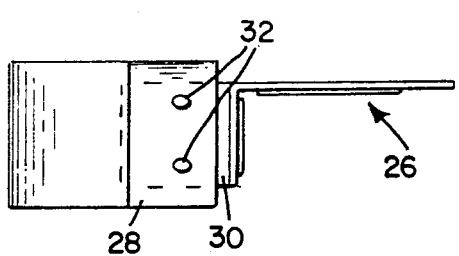
FIG. 4 is a top plan view of the fender as shown in FIG. 3.
Figure 3:
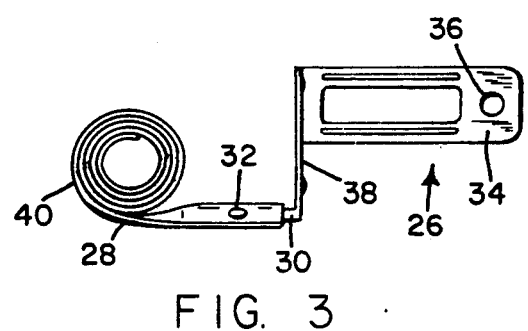
FIG. 3 is a view similar to FIG. 2 showing the fender of FIG. 2 in its retracted or coiled orientation.
Figure 5:
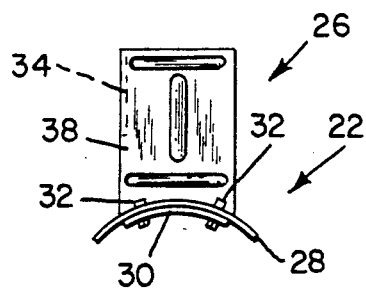
FIG. 5 is a rear elevational view of the fender as shown in FIG. 2.

The connecting bracket 26 has a pair of spaced apertures 31 which are aligned with a pair of similar spaced apertures, not shown, in the strip 28 when the strip 28 is positioned on the convex upper surface of the first horizontal end 30 of the bracket. If desired, the strip can be positioned on the lower concave side of the end 30 for assuming the curvature shown in FIG. 5. When the end of the strip 28 is fixed to the end 30 of the bracket 26 by the fasteners 32, the concave side of the strip 28 rests against the convex side of the bracket end 30 so that it maintains its curved configuration as shown in FIG. 5. The opposite end of the bracket 26 has a horizontal section 34 which has an aperture 36 for mounting the bracket onto the seat adjusting bolt 20 of the bicycle as shown in FIG. 1. The horizontal portions 30 and 34 are connected by a vertical intermediate connecting portion 38. The portion 34 is offset from the portion 30 so that when the bracket 26 is mounted to the seat-adjusting bolt 20 on one side of the frame the horizontal portion 30 and the strip 28 are vertically aligned with the rear wheel of the bicycle. The strip 28 is shown in FIG. 3 in its normal coiled state 40. This represents the retracted orientation of the fender 22. The extended orientation of the fender 22 is achieved by uncoiling the strip 28 and bowing the free end of the strip from side to side in the same direction as the end of the strip which is fastened to the end 30 of the bracket 26. This effectively returns the strip to its normal extended state as shown in FIG. 2 and enables the strip to effectively function as a fender as illustrated in FIG. 1 and enables the bicycle to be used in wet conditions. When the bicycle is used in dry conditions, the fender is retracted to the position shown in FIG. 3 by applying pressure against the convex side of the strip at the free end of the strip which enables the strip to return to its normal coiled state or the retracted orientation shown in FIGS. 3 and 4. The strip assumes its coiled state even though the fixed end of the strip remains bowed from side to side. Both ends of the strip must be bowed in order for the strip to remain in its extended state.

Figure 7:
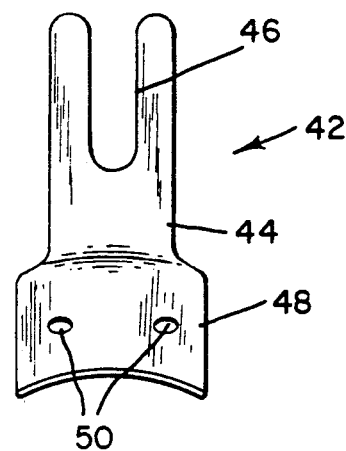
FIG. 7 is a rear elevational view of a first modified connector for the fender of the present invention which is adjustably mounted on the bolt of the front brake calipers.
Figure 8:
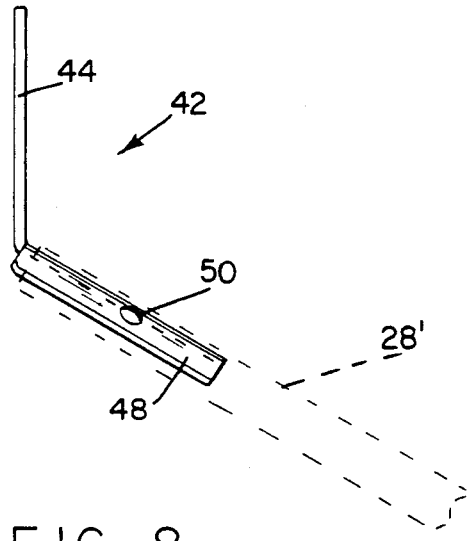
FIG. 8 is a side elevational view of the connector which is illustrated in FIG. 7.
Figure 6:
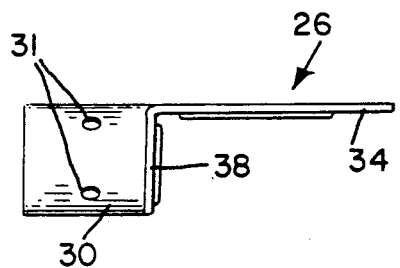
FIG. 6 is a top plan view of the mounting bracket portion of the fender which is illustrated in FIG. 4.

Referring to FIGS. 7 and 8 there is shown a first modified connecting bracket which is generally indicated by the reference numeral 42. The bracket 42 has a first vertical end 44. The vertical end 44 has a vertical slot 46 which enables the bracket to be attached to the bolt 14 of the front brake calipers 12. The slot 46 enables the bracket 42 to be vertically adjusted relative to the front wheel to conform to various bike styles. The opposite end of the bracket 42 which is indicated by the reference numeral 48 extends at a downward angle from the end 44 as shown in FIG. 8 so that it extends downwardly and rearwardly between the front wheel and the front bar 17 of the bicycle frame. The end 48 has a pair of apertures 50 which enable a strip 28' to be mounted to the bracket 42 by fasteners in the same manner as for the fender 22. The strip 28' is identical to the strip 28 except that it is shorter. The bracket 42 may also be applied to the rear brake calipers 16 if desired although the angle at which the end 48 extends from the end 44 may have to be altered by bending the end 48 upwardly so that the strip 28' extends above the rear wheel at a desired orientation relative to the rear wheel.

Figure 9:
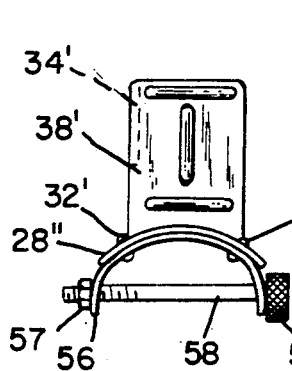
FIG. 9 is a rear elevational view of a second modified connector.

Referring to FIG. 9, there is shown a second modified connecting bracket which is generally indicated by the reference numeral 55. The forward portion of the connecting bracket 55 is identical to the bracket 26, having a second end 34' and an intermediate connecting portion 38'. However, the connecting bracket 55 has a first horizontally extending end 56 which is curved from side to side and is made of a resilient material such as spring steel. The first end 56 is fixed to the end of a strip of flexible material 28" which is identical to the strip 28 by connectors 32'. The sides of the first end 56 extend below the sides of the strip 28". A nut 57 is fixed to one side of the strip end 56 below the side edge of the strip 28". A screw 58 extends freely through opposite holes in the lower sides of the end 56 and is threaded into the nut 57. The screw 58 has a large knurled head 59 which enables the screw to be rotated about its longitudinal axis by hand. The radius of the first end 56 and, consequently, the portion of the strip 28" which is attached to the first end 56 is reduced by advancing the screw 58 through the nut 57. This increases the stiffness of the strip 28" when it is uncoiled to the extended position and makes it more difficult to return the strip to its coiled position. This enables the stiffness of the strip 28" to be adjusted by the operator by advancing or backing off the screw 58 as desired.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A retractable bicycle wheel fender comprising:
(a) a strip of flexible resilient material which has two opposite broad sides and two opposite longitudinal side edges, said strip having a first normal state in which the strip is straight between said side edges and is self-biased in a coiled configuration, said strip having a second normal state in which the strip is longitudinally straight and rigid and self-biased into a bowed configuration between said side edges, said strip being convertible from said first state to said second state by forcing said strip into a straight configuration and bowing both ends of the strip between said side edges, said strip being convertible from said second state to said first state by forcing at least some part of the strip from said bowed configuration to a straight configuration between said side edges to allow said strip to automatically assume the coiled configuration, a connector which is fixed to one end of said strip wherein the end of said strip which is fixed to said connector is maintained in a constant bowed shape, and (b) fastening means for attaching said connector to a fixed structure of a bicycle so that an opposite end of the strip is free and so that said strip extends above a wheel of the bicycle when said strip is in said second normal state.

2. A retractable fender as recited in claim 1, wherein said connector is fixed to the bicycle so that said one end of said strip remains bowed when the strip is in both of said first and second normal states.

3. A retractable bicycle wheel comprising:
(a) a strip of flexible resilient material which has two opposite broad normally flat side surfaces and two opposite longitudinal side edges, said strip being normally self-biased into a helical coiled configuration as long as said broad side surfaces remain flat, said strip maintaining a straight rigid configuration when uncoiled and forced into a bowed shape between said side edges and returning to said coiled configuration when said broad side surfaces are forced back to their normal flat shape between said side edges,
(b) a connector which is fixed to one end of said strip wherein the end of said strip which is fixed to said connector is maintained in a constant bowed shape, and
(c) fastening means for mounting said connector to a fixed structure on a bicycle so that said strip extends above a wheel of the bicycle when said strip is in the straight rigid configuration.

4. A retractable fender as recited in claim 3, wherein said connector is a bracket which has a curved surface and one end of said strip is fixed to said curved surface so that said one end conforms to and assumes the curved shape of said curved surface.

5. A retractable fender as recited in claim 4, wherein said connector is a bracket, said bracket having a first leg which is fixed to one end of said strip and a second leg constructed and arranged to be mounted to a fixed part of the bicycle.

6. A retractable fender as recited in claim 4, wherein adjusting means are provided for selectively changing the curvature of the curved surface at said one end of said bracket.

7. A retractable fender as recited in claim 3, for a bicycle which has a seat adjusting bolt (which) attached to said bicycle, said bolt extends horizontally and wherein said connector is a bracket, said bracket having a first end (which is attachable to the) constructed and arranged to attach to an end of the seat adjusting bolt (of the bicycle) and a second end (which) that is fixed to one end of said strip and which is laterally offset from the first end so that said second end and said strip are vertically aligned with the rear wheel of the bicycle.

8. A retractable fender as recited in claim 3, which has a caliper (type tire) wheel brake means which includes a bolt (which), said bolt attached to said brake means, said bolt extends horizontally front to back of the bicycle, and (,) wherein said connector is a bracket which has a first vertical portion (which is attachable) constructed and arranged to be attached to said bolt and a second portion which is fixed to one end of said strip and which extends towards the rear so that said strip is in the same vertical plane as the wheel of the bicycle.

* * * * *